(12) United States Patent
Sun et al.

(10) Patent No.: US 11,241,825 B2
(45) Date of Patent: Feb. 8, 2022

(54) RESIN POWDER, DEVICE FOR SOLID FREEFORM FABRICATION OBJECT, AND METHOD OF MANUFACTURING SOLID FREEFORM FABRICATION OBJECT

(71) Applicant: RICOH COMPANY, LTD., Tokyo (JP)

(72) Inventors: Yunsheng Sun, Kanagawa (JP); Toshiyuki Mutoh, Kanagawa (JP); Hitoshi Iwatsuki, Kanagawa (JP); Shigenori Yaguchi, Tokyo (JP); Mitsuru Naruse, Shizuoka (JP); Sohichiroh Iida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 16/555,751

(22) Filed: Aug. 29, 2019

(65) Prior Publication Data

US 2020/0070412 A1    Mar. 5, 2020

(30) Foreign Application Priority Data

Aug. 31, 2018 (JP) .............................. JP2018-162589
Aug. 21, 2019 (JP) .............................. JP2019-150795

(51) Int. Cl.
| | | |
|---|---|---|
| *B29C 64/153* | (2017.01) | |
| *B33Y 10/00* | (2015.01) | |
| *B33Y 70/00* | (2020.01) | |
| *B29C 64/20* | (2017.01) | |
| *B33Y 30/00* | (2015.01) | |
| *C08G 69/00* | (2006.01) | |
| *B29K 101/12* | (2006.01) | |
| *C08G 69/26* | (2006.01) | |

(52) U.S. Cl.
CPC ............ *B29C 64/153* (2017.08); *B29C 64/20* (2017.08); *B33Y 10/00* (2014.12); *B33Y 30/00* (2014.12); *B33Y 70/00* (2014.12); *C08G 69/00* (2013.01); *B29K 2101/12* (2013.01); *C08G 69/26* (2013.01)

(58) Field of Classification Search
None
See application file for complete search history.

(56) References Cited

U.S. PATENT DOCUMENTS

| 5,932,687 | A | * | 8/1999 | Baumann | .................. | C08J 3/14 |
| | | | | | | 528/313 |
| 6,531,086 | B1 | | 3/2003 | Larsson | | |
| 2008/0152910 | A1 | * | 6/2008 | Hesse | .................... | B22F 9/026 |
| | | | | | | 428/402 |
| 2016/0040025 | A1 | | 2/2016 | Norikane et al. | | |
| 2016/0160021 | A1 | | 6/2016 | Kojima et al. | | |
| 2016/0177122 | A1 | | 6/2016 | Naruse et al. | | |
| 2016/0236412 | A1 | | 8/2016 | Kusahara et al. | | |
| 2016/0271877 | A1 | | 9/2016 | Suzuki et al. | | |
| 2016/0271879 | A1 | | 9/2016 | Yamashita et al. | | |
| 2016/0272776 | A1 | * | 9/2016 | Arai | ...................... | C08G 69/22 |
| 2016/0304714 | A1 | | 10/2016 | Asano et al. | | |
| 2017/0182556 | A1 | * | 6/2017 | Ramaswamy | ...... | B28B 17/0081 |
| 2017/0209927 | A1 | | 7/2017 | Yamashita et al. | | |
| 2017/0217087 | A1 | | 8/2017 | Tamoto et al. | | |
| 2017/0225404 | A1 | | 8/2017 | Naruse et al. | | |
| 2018/0022024 | A1 | | 1/2018 | Saito et al. | | |
| 2018/0023219 | A1 | | 1/2018 | Saito et al. | | |
| 2018/0147780 | A1 | | 5/2018 | Kamoda et al. | | |
| 2018/0215917 | A1 | | 8/2018 | Naruse | | |
| 2018/0264720 | A1 | | 9/2018 | Tamoto et al. | | |
| 2018/0264721 | A1 | | 9/2018 | Iida et al. | | |
| 2018/0273756 | A1 | | 9/2018 | Saito et al. | | |
| 2018/0355144 | A1 | | 12/2018 | Saito et al. | | |
| 2019/0126538 | A1 | | 5/2019 | Fujita et al. | | |
| 2019/0134853 | A1 | | 5/2019 | Iwatsuki et al. | | |

FOREIGN PATENT DOCUMENTS

| CN | 107674389 | | 2/2018 |
| EP | 3 272 724 A1 | | 1/2018 |
| EP | 3 272 787 A1 | | 1/2018 |
| EP | 3 272 788 A1 | | 1/2018 |
| EP | 3 375 608 A1 | | 9/2018 |
| EP | 3 375 609 A1 | | 9/2018 |
| JP | 2018-111304 | | 7/2018 |
| JP | 2018-158571 | | 10/2018 |
| JP | 2019-084820 | | 6/2019 |
| WO | WO2008/057844 A1 | | 5/2008 |
| WO | WO2016/121013 A1 | | 8/2016 |

OTHER PUBLICATIONS

Extended European Search Report dated Jan. 24, 2020 in European Patent Application No. 19193743.2, 11 pages.
Office Action dated Jun. 23, 20121, in Chinese Patent Application No. 201910806387.2, with partial English Transaltion, 18 pages.
Wang Kai et al., "*Hybrid equipment design*", Beijing: Machinery Industry Press, 2000, pp. 203-205.
Schmid et al., "*Materials perspective of polymers for additive manufacturing with selective laser sintering*", Journal of Materials Research, 2014, 29(17):1824-1832.

\* cited by examiner

*Primary Examiner* — Robert T Butcher
(74) *Attorney, Agent, or Firm* — Grüneberg and Myers PLLC

(57) ABSTRACT

A resin powder contains a resin, wherein the proportion of fine powder having a number diameter of 40 percent or less of a mean number diameter Mn of the resin powder is 30 percent or less in the resin powder.

16 Claims, 5 Drawing Sheets

RESIN POWDER, DEVICE FOR SOLID FREEFORM FABRICATION OBJECT, AND METHOD OF MANUFACTURING SOLID FREEFORM FABRICATION OBJECT

CROSS-REFERENCE TO RELATED APPLICATIONS

This patent application is based on and claims priority pursuant to 35 U.S.C. § 119 to Japanese Patent Application Nos. 2018-162589 and 2019-150795, filed on Aug. 31, 2018 and Aug. 21, 2019, respectively, in the Japan Patent Office, the entire disclosure of which is hereby incorporated by reference herein.

BACKGROUND

Technical Field

The present invention relates to a resin powder, a device for manufacturing a solid freeform fabrication object, and a method of manufacturing a solid freeform fabrication object.

Description of the Related Art

Demand for manufacturing not only prototypes but also fabrication objects as final products has been increasing. To meet this demand, resin powder using various types of resins have been developed.

For example, a method of pulverizing a resin pellet as a raw material by applying an impact to the resin pellet or a method of stirring a melted resin in water or an organic solvent to spheroidize and granulate the resin has been proposed to manufacture such a resin powder.

SUMMARY

According to embodiments of the present disclosure, provided is a resin powder which contains a resin, wherein the proportion of fine powder having a number diameter of 40 percent or less of a mean number diameter Mn of the resin powder is 30 percent or less in the resin powder.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
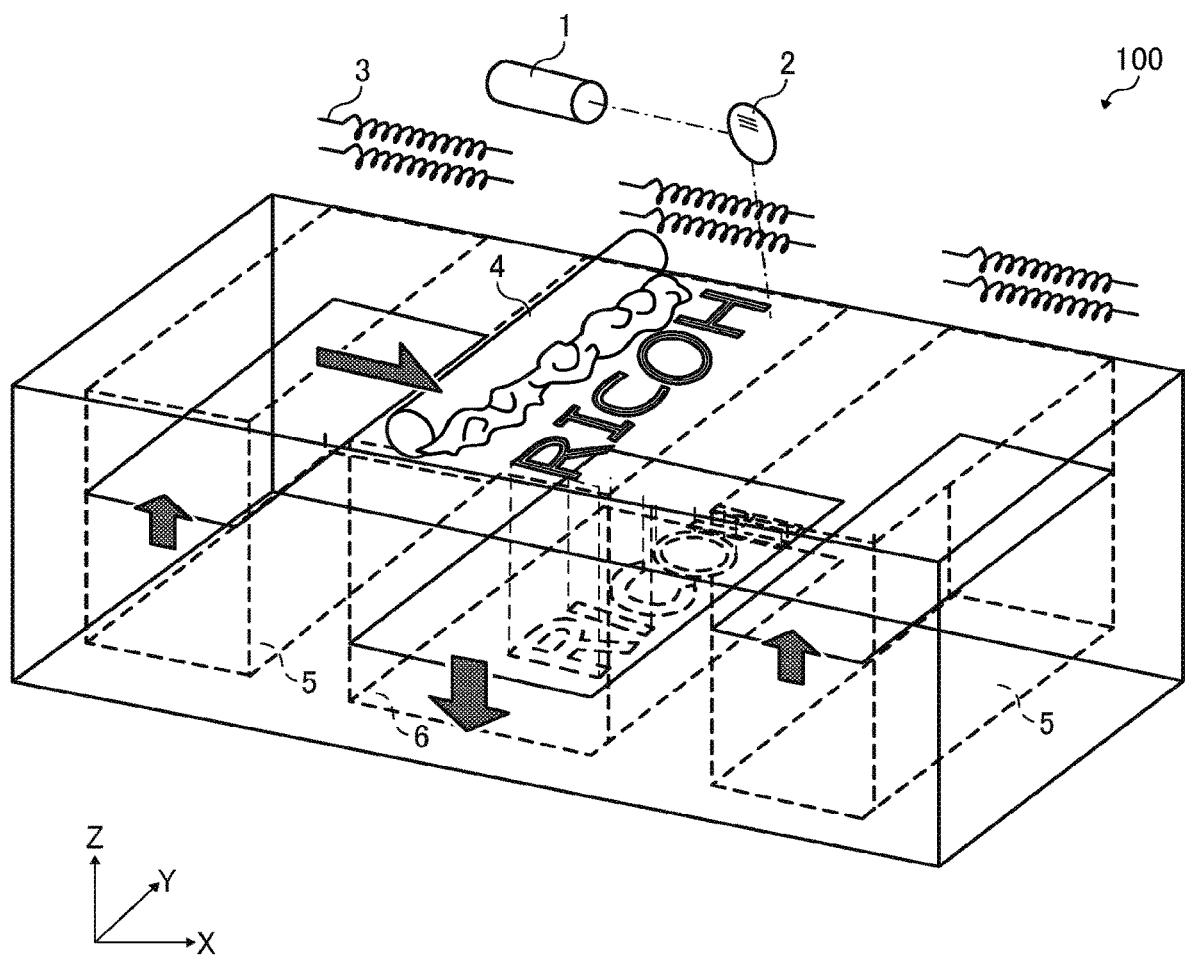
FIG. 1 is a schematic diagram illustrating an example of the device for manufacturing a solid freeform fabrication object for use in the method of manufacturing a solid freeform fabrication object according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to embodiments of the present disclosure, a resin powder is provided which has high powder flowability and excellent recyclability, with little powder scattering or fine powder adhesion or accumulation in a device.

Resin Powder

The resin powder of the present disclosure contains fine powder having a number-basis circle equivalent diameter (also referred to as number diameter) of 40 percent or less of a number-basis average circle equivalent diameter (also referred to as mean number diameter) Mn of the resin powder. The proportion of the fine powder in the resin powder is 30 percent or less. The resin powder contains a resin and other optional components.

The resin powder of the present disclosure was made based on the knowledge that some resin powder manufactured by a typical method soars or scatters in a device for manufacturing a fabrication object during fabrication, thereby adhering to the sensor portion, which causes malfunction, or accumulating on a movable portion including the periphery of the recoating mechanism and falling onto the powder surface, which leads to defective fabrication.

Therefore, the resin powder of the present disclosure contains fine powder having a number diameter of 40 percent or less of a mean number diameter Mn of the resin powder and the proportion of the fine powder in the resin powder is 30 percent or less to diminish soaring or scattering of the resin powder during handling or fabrication. Also, this reduces adhesion of the resin powder to the inside of a device for manufacturing a solid freeform fabrication object described later such as the fabrication tank, the window through which a laser beam passes, and the roller in a recoater. Furthermore, the amount of the fine powder is small so that adhesion of the resin powder to the roller, etc. of a device for manufacturing a solid freeform fabrication object during powder supply can be reduced.

Proportion of Fine Powder

In order to more accurately measure the circle equivalent diameter of relatively fine particle contained in resin powder, it is preferable to use a wet process particle size measuring device in which particle aggregation is unlikely to occur and use a mean number diameter to which the impact of relatively coarse particles is less.

The mean number diameter Mn can be measured and calculated, for example, using an imaging and wet process particle size and form analyzer (flow particle image analyzer, FPIA-3000, manufactured by Sysmex Corporation). This device is capable of taking images of particles in a suspension flowing in a glass cell by high speed imaging with a charge-coupled device (CCD) and analyzing individual particle images in real time. The number of measuring counts of the particles is not particularly limited and preferably 6,000 or greater and more preferably 10,000 or greater.

The circle equivalent diameter can be obtained by the following equation, where S represent area (number of pixels).

Circle equivalent diameter=positive square root of $\{4 \times (S)/\pi\}$

The equivalent circle diameter is calculated for the projections of individual particles. The mean number diameter Mn can be calculated by calculating the average value (number basis) of the obtained circle equivalent diameters.

The mean number diameter Mn in the resin powder of the present disclosure is preferably from 1 to 200 μm, more preferably from 3 to 110 μm, furthermore preferably from 3 to 100 μm, particularly preferably from 10 to 60 μm, more particularly preferably from 20 to 60 μm, furthermore particularly preferably from 25 to 60 μm, and most preferably from 30 to 60 μm.

When the mean number diameter Mn is within this range, soaring of the resin powder while forming a powder layer can be reduced. As a result, the surface of the powder layer is smooth. In addition, voids between the resin powder can be reduced, thereby further enhancing surface property and dimension accuracy of a solid freeform fabrication object.

In the resin powder of the present disclosure, the proportion of fine powder having a number diameter of 40 percent or less of the mean number diameter Mn in the number diameter distribution of the resin powder is 30 percent or less, preferably 29 percent or less, more preferably 28 percent or less, furthermore preferably 25 percent or less, more furthermore preferably 24 percent or less, particularly preferably 23 percent or less, more particularly preferably 22 percent or less, furthermore particularly preferably 21 percent or less, more furthermore particularly preferably 20 percent or less, and most preferably from 0.1 to 20 percent or less.

When the proportion of fine powder in the resin powder is 30 percent or less, it is possible to reduce soaring or scattering of the resin powder during handling or fabrication. Also, this reduces adhesion of the resin powder to the inside of a device for manufacturing a solid freeform fabrication object such as the fabrication tank, the window through which a laser beam is transmitted, and the roller in a recoater. Furthermore, since the resin powder can be prevented from adhering to the roller, etc., of the device for manufacturing a solid freeform fabrication object during supply of the resin powder, it is also possible to prevent dents or waving of the powder surface until the lamination temperature becomes close to the melting point of the resin. Therefore, the smoothness of the powder surface can be maintained in a wide temperature range.

The form of the cross-section of the particle in the resin powder is not particularly limited and can be suitably selected to suit to a particular application. For example, columnar particle (e.g., cylindrical particle, rectangular particle, etc.), spherical particle, quasi-spherical particle etc., are suitable. Of these, columnar particles are preferable in terms that the columnar particles can be packed without gaps and the tensile strength of an obtained solid freeform fabrication object can be improved.

The form of each particle in resin powder can be observed and distinguished by, for example, a scanning electron microscope (S4200, manufactured by Hitachi Ltd.), a wet process particle size and form analyzer (flow particle image analyzer, FPIA-3000, manufactured by Sysmex Corporation), etc.

Specific Surface Area

The method of measuring a specific surface area of resin powder is roughly classified into the permeation method and the gas adsorption method. The gas adsorption method includes the volume method, the weight method, and the flow method. The BET method based on physical adsorption of an inert gas in a low temperature and low humidity environment is preferable because the measurement can be easily reproduced.

For the resin powder of the present disclosure, the BET specific surface area measured by the BET method is preferably 0.50 $m^2/g$ or less, more preferably 0.30 $m^2/g$ or less, and furthermore preferably 0.10 $m^2/g$ or less. When the BET specific surface area is in the above-specified range, the resin powder does not easily adsorb moisture in the surrounding environment, and the adhesion force acting between the particles is reduced by the liquid cross-linking between particles, so that a decrease in fluidity of the resin powder can be avoided.

In addition, resin powder is heated to a temperature close to the melting point of the resin powder by a heater, etc., even in a portion not sintered or melted by a selective heat source during fabrication so that the resin powder thermally deteriorates, which is known to have an adverse impact on fabrication for the following occasions. Thermal deterioration is more likely to occur because reactivity of a particle is high as the BET specific surface area of a particle increases. Therefore, when the BET specific surface area of the resin powder is in the above-specified range, thermal deterioration of the resin does not easily occur so that deterioration of the unsintered or unmelted powder is diminished, thereby enhancing recyclability.

Average Circularity of Fine Powder

In the present disclosure, the average circularity of the fine powder having a number diameter of 40 percent or less of the mean number diameter Mn is preferably 0.950 or less, more preferably 0.920 or less, furthermore preferably 0.915 or less, more further preferably 0.912 or less, particularly preferably 0.900 or less, more particularly preferably 0.860 or less, furthermore particularly preferably 0.856 or less, and most preferably 0.850 or less. In addition, the average circularity is preferably 0.700 or more, more preferably 0.778 or more, furthermore preferably 0.780 or more, more furthermore preferably 0.781 or more, particularly preferably 0.782 or more, and most preferably from 0.700 to 0.850.

The average circularity is an index for the degree of circularity and the average circularity of 1 means true circle. The circularity is obtained by the following relation, where S represents an area (number of pixels) and L represents a perimeter.

$$Circularity = 4\pi S/L^2$$

The degree of circularity of the resin powder is measured for the range of the particle diameter having a number diameter of 40 percent or less of the mean number diameter Mn of the resin powder and the arithmetical means thereof is identified as the average circularity of the fine powder.

The average circularity of the fine powder can be easily obtained by, for example, digitization based on the measuring using a wet process flow type particle size and form analyzer (flow particle image analyzer, FPIA-3000, manufactured by Sysmex Corporation). This device is suitable to obtain the degree of circularity relating to the present disclosure because it takes an image of a particle and analyzes the image.

The fine powder adheres to a roller, etc of a device for manufacturing a solid freeform fabrication object and creates dents or waving on the powder surface during powder supply, which causes defective fabrication. The attached powder can be removed by, for example, rubbing the roller, etc. of the device for manufacturing a solid freeform fabrication object with a cleaning blade made of, for example, urethane rubber. This is preferable because fine powder having a low average circularity tend to get stuck in protrusions of the cleaning blade, which enhances removability.

Recyclability

Due to the usage of the resin powder of the present disclosure, it is possible to obtain good recyclability and reduce deterioration of dimension accuracy and strength of a solid freeform fabrication object for repeated use of extra powder.

Since fine powder having a small particle diameter and particles having a fine uneven structure on the surface have a large specific surface area and are highly reactive, these particles are easily affected by thermal degradation, which degrades recyclability. Also, a fluidizer is externally added to improve flowability of resin powder. However, the externally added fluidizer is detached due to friction between resin powder and a device or resin powder or softened and embedded due to heat. This impairs enhancement on flowability and degrades recyclability as fabrication is repeated.

The resin powder of the present disclosure is not easily affected by the above-mentioned thermal deterioration if limiting the proportion of the fine powder, the specific surface area, etc. In addition, since sufficient flowability can be obtained without the addition of a fluidizer, high recyclability is maintained.

To check the recyclability, it is effective to repeat a test of fabrication while returning unsintered and unmelted portion of the powder used for fabrication to the supply bed.

Due to the recycled powder for use in the present disclosure, after the recycled powder is tested at least once in an SLS method device (AMS S5500P, manufactured by Ricoh Co., Ltd.) for fabricating a solid freeform fabrication object, the fabrication object is free of "orange peel" or significant mechanical performance deterioration (degradation in tensile strength by 30 percent or more). In addition, it is particularly preferable when International Organization for Standardization (ISO) 3167 TYPE1A 150 mm long multipurpose dog bone like test specimens can be formed without a defect with the recycled powder after tested 10 times or more.

The "orange peel" means surface deficiency such as unsuitable coarse surface or voids or warp on the surface of a fabricated object formed by laser sintering according to the SLS method in general. Voids may have significant adverse impacts on mechanical strength as well as aesthetic aspects.

Mv/Mn

It is more preferable that the resin powder be close to a mono-dispersion formed as the same aggregate without unevenness in particle form and size. Due to this, the dimension accuracy and the strength of a solid freeform fabrication object can be further improved. Specifically, Mv/Mn of the resin powder is preferably 2.00 or less, more preferably 1.50 or less, furthermore preferably 1.41 or less, more furthermore preferably 1.40 or less, particularly preferably 1.39 or less, more particularly preferably 1.38 or less, furthermore particularly 1.37 or less, most preferably 1.35 or less, more most preferably 1.34 or less, furthermore most preferably 1.31 or less, particularly preferably 1.30 or less, best and most preferably 1.29 or less, more best and most preferably 1.25 or less, and furthermore best and most preferably 1.20 or less. Mv represents mean volume diameter (μm) (also referred to as volume-basis average circle equivalent diameter) of the resin powder and Mn represents mean number diameter (μm) of the resin powder.

Bulk Density

In terms of promotion of the degree of laser sintering in the SLS method, it is preferable that the bulk density be large in spite of the difference in the density of the resin powder.

Furthermore, it is preferable that solid freeform fabrication object formed by laser sintering using resin powder be free of unsuitable process properties such as warp, distortion, and fuming ascribable to phase changes between sintering and cooling after sintering.

It is preferable that resin fibers processed into a fiber form be cut to manufacture the resin powder. The cut pitch of the resin fiber is preferably from 0.04 to 0.10 mm and more preferably from 0.04 to 0.06 mm. It is preferable to use suitably-dried resin powder. Using a vacuum drier or silica gel is suitable to dry the resin powder before use.

Resin

It is preferable to use a thermoplastic resin for the resin powder.

Thermoplastic resin is generally softened to have plasticity when heated and solidified when cooled.

The thermoplastic resin preferably has a melting point of 100 degrees C. or higher as measured according to ISO 3146 regulation. It is preferable that the melting point of the resin powder as measured according to ISO 3146 regulation be 100 degrees C. or higher because it is within the heat resistance temperature range for exteriors of products, etc.

The melting point can be measured according to ISO 3146 regulation (plastic transition temperature measuring method, JIS K7121 format) utilizing differential scanning calorimetry (DSC). When a plurality of melting points exist, the melting point on the higher temperature side is used.

The thermoplastic resin has no particular limit and can be suitably selected to suit to a particular application.

Specific examples include, but are not limited to, polyolefin, polyamide, polyester, polyther, polyarylketone, a liquid crystal polymer (LCP), polyacetal (POM), polyimide, a fluorochemical resin, and polyphenylene sulfide. These can be used alone or in combination.

Specific examples of the polyolefine include, but are not limited to, polyethylene (PE) and polypropylene (PP). These can be used alone or in combination.

Specific examples of the polyamide include, but are not limited to, polyamide 410 (PA410), polyamide 6 (PA6), polyamide 66 (PA66), polyamide 610 (PA610), polyamide 11 (PAID, semi-aromatic polyamide 4T (PA4T), polyamide MXD6 (PAMXD6), polyamide 6T (PA6T), polyamide 9T (PA9T), and polyamide 10T (PA10T). These can be used alone or in combination.

Of these, PA9T is also referred to as polynonane methylene terephthal amide and constituted of a diamine having 9 carbon atoms and a terephthalic acid. In general, since the carbon acid side is an aromatic series, PA9T is referred to as semi-aromatic series. Moreover, as a whole aromatic series in which both carboxylic acid side and diamine side are aromatic, aramid constituted from p-phenylenediamine and a terephathalic acid is also included as polyamides.

Specific examples of the polyester include, but are not limited to, polyethyleneterephthalate (PET), polybutylene terephthalate (PBT), and polylactic acid (PLA). To impart heat resistance, polyester including aromatic series partially including terephthalic acid and isophthalic acid is also suitably used.

Specific examples of the polyether include, but are not limited to, polyether etherketone (PEEK), polyetherketone (PEK), polyether ketone ketone (PEKK), polyaryl ether ketone (PAEK), polyether ether ketone ketone (PEEKK), and polyetherkeone ether ketone ketone (PEKEKK). These can be used alone or in combination.

The thermoplastic resin is preferably a crystalline resin. The crystalline resin has a melting peak as measured according to ISO 3146 regulation (plastic transition temperature measuring method, JIS K7121 format).

Specific examples of the crystalline resin include, but are not limited to, polybutylene terephthalate (PBT) and polyetheretherketone (PEEK). These can be used alone or in combination.

Of these, a crystal-controlled crystalline thermoplastic resin is preferable. Such a crystalline thermoplastic resin having a crystal size and a controlled crystal alignment can be obtained by a method of applying external stimuli such as heat, drawing, crystal nuclear material, and ultrasonic treatment.

Additive

The resin powder may contain additives in addition to the resin.

Such an additive is not particularly limited and can be suitably selected to suit to a particular application. For example, antioxidant, a flame retardant, an inorganic reinforcing agent, a fluidizer, a plasticizer, a crystal nucleating agent, etc. can be added.

The additive may be mixed with the thermoplastic resin before or after the resin is powdered.

Such an antioxidant is not particularly limited, can be suitably selected to suit to a particular application, and includes so-called deterioration inhibitor and stabilizer. Examples include, but are not limited to, hydrazide-based compounds and amide-based compound, which are metal deactivators, phenol-based compounds (hindered phenol-based compounds) and amine-based compounds that are radical scavengers, phosphate-based compounds and sulfur-based compounds that are peroxide decomposers, and triazine-based compounds that are ultraviolet light absorbers. These can be used alone or in combination.

Of these, a combination of a radical scavenger and a peroxide decomposer is preferable in terms of the antioxidant effect.

Examples of the flame retardant include, but are not limited to, halogen-based, phosphorine-based, inorganic hydrated metal compound-based, nitrogen-containing, and silicone-based retardants and inorganic reinforcing agents. These can be used alone or in combination. If two or more flame retardants are used in combination, the combination of halogen-based and inorganic hydrated metal compound-based flame retardants is preferable to enhance flame retardancy.

Flame retardancy of resin powder can be evaluated by, for example, JIS K6911 format, JIS L1091 format (ISO 6925 regulation), JIS C3005 format, and pyrogen test (using a cone calorimeter).

The proportion of the flame retardant in total amount of the resin powder is preferably from 1 to 50 percent by mass and more preferably from 10 to 30 percent by mass to further enhance flame retardancy. When the proportion is within the above-specified range, flame retardancy will be sufficient.

As the inorganic reinforcing agent, for example, inorganic fibrous materials such as glass fiber, carbon fiber, and aramid fiber and inorganic laminar silicates such as talc, mica, and montmorillonite are usable. Addition of an inorganic reinforcing agent contributes to enhancing flame retardancy. It is also preferable in terms of striking a balance of strengthening physical property and flame retardancy.

The fluidizer partially or entirely covers the surface of the resin powder to improve flowability of the resin powder. If flowability of the resin powder increases, surface smoothness of the powder layer during recoating increases. In addition, voids in the resin powder are reduced, which makes it possible to further improve surface property, dimension accuracy, and strength of a solid freeform fabrication object. It is preferable that such a fluidizer cover the surface of the resin powder. However, the fluidizer may be partially embedded in the resin powder.

The average primary particle diameter of the fluidizer is preferably 500 nm or less and more preferably 50 nm or less.

When the average primary particle diameter is in this range, the covering ratio of the surface of the resin powder by fluidizer can be increased so that voids can be reduced in addition to the enhancement of flowability.

There is no specific limit to the fluidizer and it can be suitably selected to suit to a particular application. For example, spherical inorganic particles are preferable and a metal oxide is more preferable.

Specific examples of the fluidizer include, but are not limited to, silica, alumina, titania, zinc oxide, magnesium oxide, tin oxide, iron oxide, and copper oxide. These can be used alone or in combination. Of these, silica and titania are preferable.

The fluidizer having a hydrophobized surface is preferably used. There is no specific limit to the hydrophobizing method and known methods can be suitably selected.

Specific examples of the hydrophobizing agent include, but are not limited to, silane coupling agents such as hexamethyl disilazane (HMDS) and dimethyldichlorosilane (DMDS) and silicone oil treating agents such as dimethyl silicone oil and amino-modified silicone oil. Of these, silane coupling agents are preferable.

The processing amount of the hydrophobizing agent is preferably from 2 to 6 mg/m$^2$ per surface area of the resin powder.

The proportion of the fluidizer in the resin powder is preferably from 0.05 to 3 percent by mass and more preferably from 0.1 to 1.5 percent by mass. When the proportion is within the range specified above, flowability of the resin powder can be improved and at the same time the impact of reduction of filling density ascribable to an increase of voids can be minimized, which is preferable.

A known powder mixer is used in the mixing and coating processes of the fluidizer with the resin powder. A mixer equipped with a jacket, etc. is preferably used to control the temperature of the inside of the mixer. In addition, it is possible to arbitrarily change the rotational frequency, speed, time, temperatures, etc. of the powder mixer.

Specific examples of the powder mixer include, but are not limited to, V-type mixers, Henschel mixers, Rocking mixers, Nautor mixers, and Super mixers.

The inorganic reinforcing agent is added to increase the strength. For example, inorganic fibrous materials such as glass fiber, carbon fiber, and aramid fiber, inorganic laminar silicates such as talc, mica, and montmorillonite, aluminum balls, and articles specified in WO-2008-057844. Addition of an inorganic reinforcing agent contributes to enhancing flame retardancy. It is also preferable in terms of striking a balance between strengthening physical property and flame retardancy.

Method of Manufacturing Resin Powder

The method of manufacturing resin powder of the present disclosure include, for example, forming resin into fibers and thereafter cutting the fibers to directly obtain a columnar form or forming resin into film-like form and thereafter cutting the resin film to obtain the same columnar form.

How to prepare fiber is, for example, using an extruder, drawing a melted resin in a fibrous form during stirring at temperatures 30 degrees C. or greater higher than the melting point. It is preferable to draw the melted resin to about $\frac{1}{1}$ to about $\frac{1}{10}$ to obtain the fiber. The form of the base of the columnar form particle is determined by the form of the nozzle orifice of an extruder. For example, if the form of the base, i.e., the cross section of fiber, is circular, a nozzle having a circular orifice is used. For a polygonal columnar form, the nozzle orifice is selected in accordance with the form. It is preferable that the dimension accuracy of a solid freeform fabrication object be higher. The circular form of a plane portion is at least 10 percent or less at radius. In addition, it is preferable to have more nozzle orifices to enhance productivity.

For the cutting, a cutting machine employing a guillotine method in which both the upper edge and the lower edge are blades or a cutting machine employing a straw cutter method of cutting with an upper edge and not a blade but a board placed on the bottom side can be used. It is also preferable to use a known device which directly cuts fibers to a size of from 0.005 to 0.2 mm and more preferably from 0.04 to 0.06 mm or a method of using $CO_2$ laser to cut the fiber. Utilizing such a method and a device, it is possible to obtain resin powder containing particles having columnar forms containing fine powder having a small proportion in the resin powder.

It is also suitable to employ a method of pulverizing pellets as the method of manufacturing the resin powder of the present disclosure. For example, resin having a form of pellet, etc., is mechanically pulverized using a known pulverizer and thereafter the thus-obtained resin powder is classified to obtain resin having a particle diameter outside the target. The temperature during pulverization is preferably 0 degrees C. or lower (lower than the brittle temperature of each resin), more preferably −25 degrees C. or lower, and particularly preferably −100 degrees C. or lower to enhance pulverization efficiency.

Furthermore, it is preferable that the pulverized powder be dispersed and sprayed into hot air to melt the particle and spheroidize it utilizing surface tension, thereby enhancing flowability and reducing the specific surface area. For example, it is possible to spheroidize using a surface modification device (Meteor Rainbow, manufactured by Nippon Pneumatic Mfg. Co., Ltd.).

Application of Resin Powder

The resin powder of the present disclosure is suitably used in various solid freeform fabrication methods such as SLS method, SMS method, MJF (Multi Jet Fusion) method, HSS (High Speed Sintering) method, or BJ (Binder Jetting) method.

The resin powder of the present disclosure can be suitably applied to surface modifying agents, spacers, lubricants, paints, grind stone, additives, secondary battery separator, foods, cosmetics, and cloths in addition to the solid freeform fabrication method. In addition, it can be used as material or metal substitution material for use in fields such as auto mobiles, precision devices, semiconductor, aerospace, and medicals.

Method of Manufacturing Solid Freeform Fabrication Object and Device for Manufacturing Solid Freeform Fabrication Object The method of manufacturing a solid freeform fabrication object includes forming a layer containing a resin powder containing a resin, curing the layer, and repeating the forming and curing, wherein the proportion of fine powder having a number diameter of 40 percent or less of the mean number diameter Mn of the resin powder is 30 percent or less in the resin powder. The formed layer can be irradiated with electromagnetic waves to melt the layer and the melted layer is cooled down to cure the layer.

The device for manufacturing a solid freeform fabrication object includes a layer forming device configured to form a layer containing a resin powder containing a resin and a powder attaching device configured to attach the resin powder to each other in a selected area of the layer, wherein the proportion of fine powder having a number diameter of 40 percent or less of a mean number diameter Mn of the resin powder is 30 percent or less in the resin powder.

The method of manufacturing a solid freeform fabrication object of the present disclosure can be suitably executed by the device for manufacturing a solid freeform fabrication object of the present disclosure. As the resin particle, the same as those of the present disclosure can be used.

The resin powder of the present disclosure can be used for any of the device for manufacturing a solid freeform fabrication object employing a powder additive manufacturing method. The device for manufacturing a solid freeform fabrication object executing a powder additive manufacturing method includes a different device to attach resin powder to each other in a selected area and in general has an electromagnetic irradiator represented in SLS method or SMS method and a liquid discharging device represented in a binder jetting (BJ) method. The resin powder of the present disclosure can be applied to any of those and all the devices for manufacturing a solid freeform fabrication object including devices for powder additive manufacturing.

For the device for manufacturing a solid freeform fabrication object employing SLS method or SMS method utilizing electromagnetic irradiation, as the electromagnetic irradiation source for use in electromagnetic irradiation, for example, it is possible to use laser that emits ultraviolet rays, visible light, infrared rays, etc., microwave, discharging, electron beams, a radiant heater, an LED lamp, and a combination thereof.

In addition, for the method of causing the resin powder to selectively adhere to each other utilizing electromagnetic irradiation, absorption of electromgnetic wave can be changed in terms of efficiency or prevention. For example, it is possible to cause the resin powder to contain an absorbent or retarder.

An example of the device 100 for manufacturing a solid freeform fabrication object of the present disclosure is described with reference to FIG. 1. The device 100 for manufacturing a solid freeform fabrication object illustrated in FIG. 1 stores powder in a supply tank 5 for powder and supplies the powder to a laser beam scanning space 6 using a roller 4 in proportion to the usage amount. It is preferable that the temperature of the supply tank 5 be controlled by a heater 3. The laser beam scanning space 6 is irradiated with the laser beams emitted from an electromagnetic irradiation source 1 using a reflection mirror 2. The powder is sintered with the heat of the laser beams to obtain a solid freeform fabrication object.

The temperature of the supply tank 5 is preferably 10 degrees C. or more lower than the melting point of the powder.

The temperature of the part bed in the laser beam scanning space 6 is preferably 5 degrees C. or more lower than the melting point of the powder.

The power of the laser has no particular limit and can be suitably selected to suit to a particular application. For example, it is preferably from 10 to 150 W.

In another embodiment, solid freeform fabrication objects in the present disclosure can be manufactured using selective mask sintering (SMS) technologies. The SMS process suitably usable is described in, for example, the specification of U.S. Pat. No. 6,531,086.

In the SMS process, powder layers are partially and selectively irradiated with infra red, which is selectively shielded by using a shielding mask. When utilizing the SMS process to manufacture a solid freeform fabrication object from the resin powder of the present disclosure, it is possible and preferable to contain material to enhance infrared absorption of the resin powder. For example, the resin powder may contain at least one type of heat absorbent and/or dark color material (such as carbon fiber, carbon black, carbon nanotube, and cellulose nanofiber).

In yet another embodiment, using the resin powder of the present disclosure, a solid freeform fabrication object can be manufactured by a device 200 for manufacturing a solid freeform fabrication object employing the binder jetting method mentioned above. The method of manufacturing a solid freeform fabrication object includes a layer forming process to form a layer containing the resin powder of the present disclosure and a powder adhesion process to discharge liquid to a selected area of the layer followed by drying to attach the resin powder to each other, and repeating the layer forming process and the powder adhesion process, and may furthermore optionally include other processes.

The device 200 for manufacturing a solid freeform fabrication object includes a layer forming device to form a layer including the resin powder of the present disclosure and a liquid discharging device to discharge liquid to a selected area of the layer and may furthermore optionally include other devices. As the discharging device to discharge liquid, it is preferable to employ an inkjet method in terms of dimension accuracy and fabrication performance of a solid freeform fabrication object to be obtained.

FIG. 2 (FIG. 2A to FIG. 2F) is a schematic diagram illustrating an example of the process of the binder jetting (BJ) method. The device 200 for manufacturing a solid freeform fabrication object illustrated in FIGS. 2A to 2F includes a powder storage tank 11 for fabrication and a powder storage tank 12 for supplying. Each of these powder storage tanks 11 and 12 has a stage 13 movable up and down and places the resin powder on the stage 13 to form a layer formed of the resin powder. A fabrication liquid supplying device (powder attaching device) 15 is disposed over the powder storage tank 11 for fabrication to discharge a liquid material 16 for solid freeform fabrication toward the resin powder in the powder storage tank 11 for fabrication. Furthermore, the device 200 for manufacturing a solid freeform fabrication includes a resin powder layer forming device 14 (hereinafter also referred to as recoater) capable of supplying the resin powder from the powder storage tank 12 for supplying to the powder storage tank 11 for fabrication and smoothing the surface of the resin powder layer in the powder storage tank 11 for fabrication.

Figure 2A:
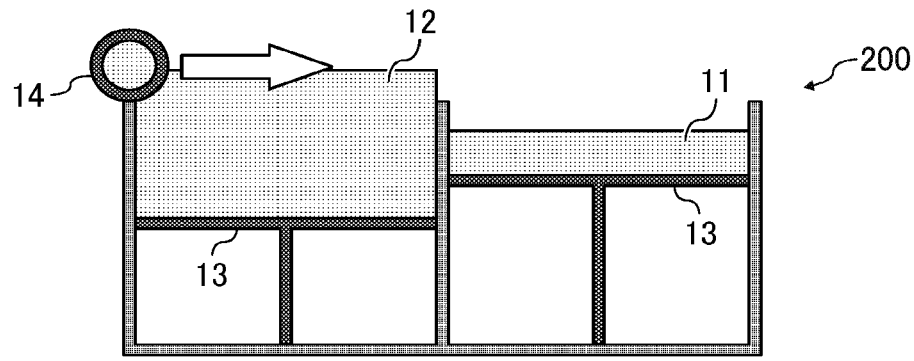
FIG. 2A is a schematic diagram illustrating an example of the process of forming a powder layer having a smooth surface in the method of manufacturing a solid freeform fabrication object according to an embodiment of the present disclosure.
Figure 2B:
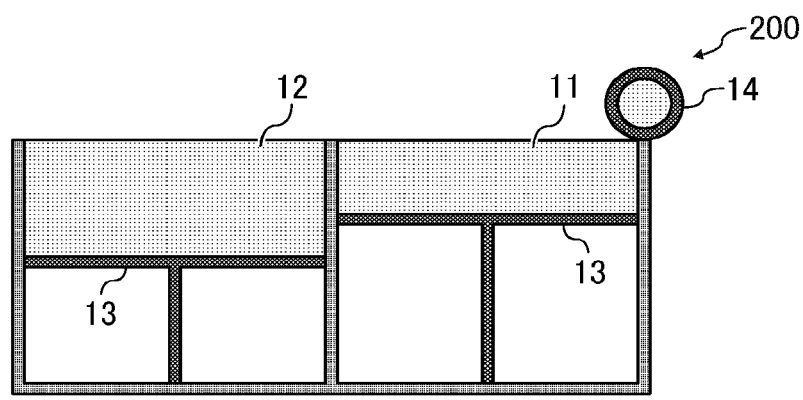
FIG. 2B is a schematic diagram illustrating another example of the process of forming a powder layer having a smooth surface in the method of manufacturing a solid freeform fabrication object according to an embodiment of the present disclosure.

FIGS. 2A and 2B are diagrams illustrating the step of supplying the resin powder from the powder storage tank 12 for supplying to the powder storage tank 11 for fabrication and the step of forming the resin powder layer having a smooth surface. Each stage 13 of the powder storage tank 11 for fabrication and the powder storage tank 12 for supplying is controlled to adjust the gap therebetween to obtain a desired layer thickness. Thereafter, the resin powder layer forming device 14 is moved from the powder storage tank 12 for supplying to the powder storage tank 11 for fabrication to form a resin powder layer in the powder storage tank 11 for fabrication.

Figure 2C:
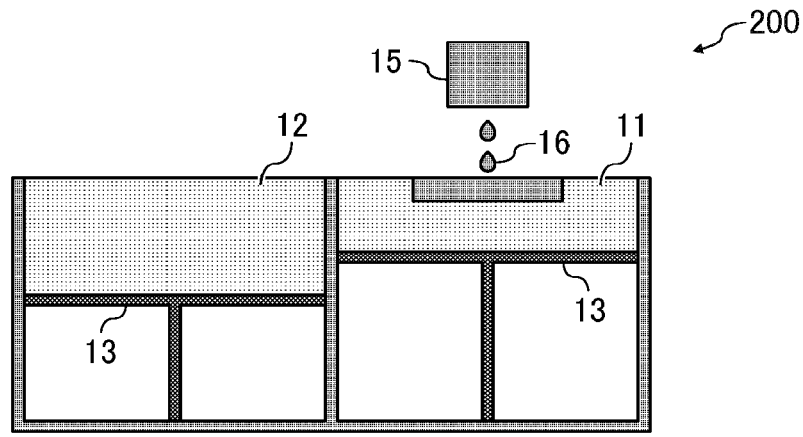
FIG. 2C is a schematic diagram illustrating an example of the process of dripping a liquid material for solid freeform fabrication in the method of manufacturing a solid freeform fabrication object according to an embodiment of the present disclosure.

FIG. 2C is a diagram illustrating the process of dripping the liquid material 16 for solid freeform fabrication onto the resin powder layer in the powder storage tank 11 for fabrication by using the fabrication liquid supplying device 15. At this point, the position where the liquid material 16 for solid freeform fabrication is dripped on the resin powder layer is set based on two-dimensional image data (slice data) obtained by slicing the solid freeform fabrication object into multiple plane layers.

Figure 2D:
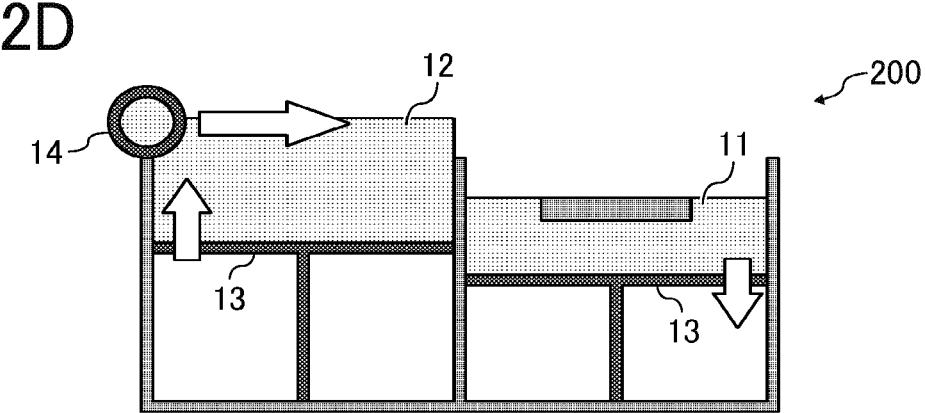
FIG. 2D is a schematic diagram illustrating an example of the process of newly forming a resin powder layer in a powder storage tank for fabrication in the method of manufacturing a solid freeform fabrication object according to an embodiment of the present disclosure.
Figure 2E:
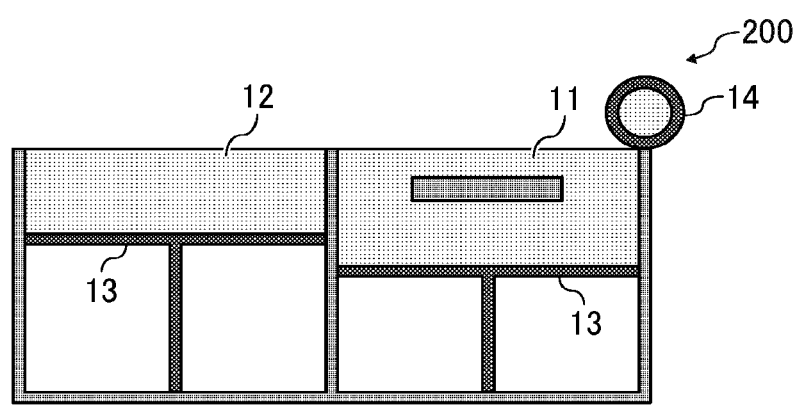
FIG. 2E is a schematic diagram illustrating another example of the process of newly forming a resin powder layer in a powder storage tank for fabrication in the method of manufacturing a solid freeform fabrication object according to an embodiment of the present disclosure.

In FIGS. 2D and 2E, the stage 13 of the powder storage tank 12 for supplying is elevated and the stage 13 of the powder storage tank 11 for fabrication is lowered while controlling the gap therebetween to obtain a desired thickness. Thereafter, the resin powder layer forming device 14 is moved again from the powder storage tank 12 for supplying to the powder storage tank 11 for fabrication. As a result, a new resin powder layer is formed in the powder storage tank 11 for fabrication.

Figure 2F:
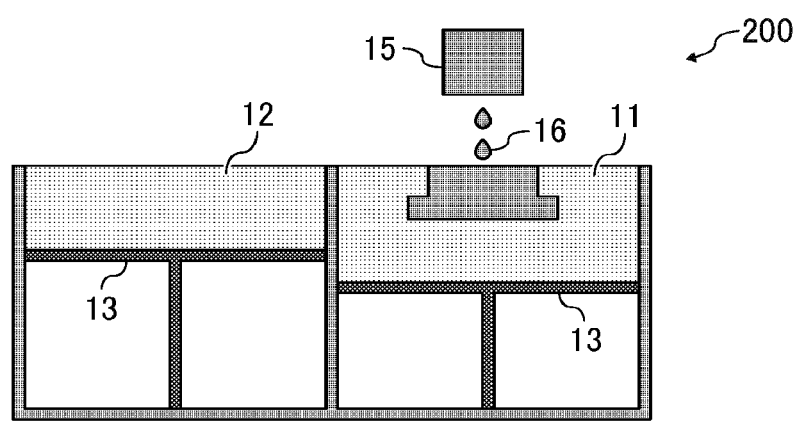
FIG. 2F is a schematic diagram illustrating an example of the process of dripping a liquid material for solid freeform fabrication again in the method of manufacturing a solid freeform fabrication object according to an embodiment of the present disclosure.

FIG. 2F is a diagram illustrating the process of dripping the liquid material 16 for solid freeform fabrication again onto the resin powder layer in the powder storage tank 11 for fabrication by using the fabrication liquid supplying device 15. This series of processes is repeated. Subsequent to optional drying, the resin powder to which no liquid material for solid freeform fabrication is attached is removed as extra powder to obtain a solid freeform fabrication object.

It is preferable to contain an adhesive to cause the resin powder to adhere to each other. The adhesive can be dissolved in liquid to be discharged. Alternatively, the adhesive can be mixed with the resin powder as an additive particle. The adhesive is preferably dissolved in liquid to be discharged. For example, the adhesive is preferably water-soluble if the liquid to be discharged is mainly composed of water.

Examples of the water-soluble adhesive are polyvinyl alcohol (PVA), polyvinyl pyrrolidone, polyamide, polyacrylic amide, polyethylene imine, polyethylene oxides, polyacrylate resins, cellulose resins, and gelatin. Of these, polyvinyl alcohol is more preferably used to enhance strength and dimension accuracy of a solid freeform fabrication object.

In addition, the attached solid freeform fabrication object may be sintered later to enhance strength.

Solid Freeform Fabrication Object

The solid freeform fabrication object can be suitably manufactured by the device for manufacturing a solid freeform fabrication object of the present disclosure using the resin powder of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Examples 1 to 15 and Comparative Examples 1 to 5

Manufacturing of Resin Powder

Based on the manufacturing process shown in Table 1, resin powders of Examples 1 to 15 and Comparative Examples 1 to 5 were obtained by the following method.

The detailed contents of the resin powder manufacturing process are as follows.

Powdering Method

1. Fiber cutting: Resin material pellet as a raw material was stirred at a temperature 30 degrees C. higher than the melting point using an extruder and thereafter stretched into a fibrous form having a diameter of from 0.04 to 0.10 mm. Each of the resin was stretched 1 to 10 times to obtain resin having a fibrous form and thereafter directly cut with a pitch of from 0.04 to 0.10 mm.

2. Frost shattering: Resin material pellet as a raw material was subject to frost shattering at −200 degrees C. in such a manner that the mean volume diameter (volume-basis average circle equivalent diameter) was from 5 to 100 μm.

3. Suspension polymerization: Resin having a spherical form was granulated by a suspension polymerization method from monomers constituting resin species as a raw material to have a mean number diameter of from 20 to 50 μm.

Spheroidization

1. Mechanical stirring: The thus-obtained resin powder was subjected to mechanical stirring for spherodization using a spherodizing device (MP type mixer MP5A/1, manufactured by NIPPON COKE & ENGINEERING. CO., LTD.). The stirring speed of the spherodizing device was 5,000 to 9,000 rpm and the treatment time was 10 minutes.

2. Surface melting: The surface of the thus-obtained resin powder was melted using a surface reforming device (Meteor Rainbow, manufactured by Nippon Pneumatic Mfg. Co., Ltd.) to spherodize the resin powder. The heating temperature of the surface reforming device was set to 100 degrees C. higher than the resin powder melting point and the processing speed was set to 20 kg/hour or 40 kg/hour.

Screening

The obtained resin powder was screened through a vibrating sieve with an aperture of 38 μm or 53 μm for 30 minutes to obtain resin powder remaining on the sieve.

Addition of Fluidizer

A fluidizer (AEROSIL RX 200, manufactured by Nippon Aerosil Co., Ltd., surface treatment agent HMDS, average primary particle diameter of 12 nm) was dry-blended with the obtained resin powder in an amount of from 0.05 to 0.5 percent by mass.

Type of Resin

The type of resin used was a polybutylene terephthalate (PBT) resin, a polyetheretherketone (PEEK) resin, a polypropylene (PP) resin, and a polyamide 66(PA66).

Polybutylene terephthalate (PBT) resin (Novaduran 5020, Mitsubishi Engineering Plastics Corporation)

Polyether ether ketone (PEEK) resin (HT P22PF, manufactured by Victrex plc.)

Polypropylene (PP) resin (Novatec MA3, manufactured by Nippon Polypropylene Corporation)

Polyamide 66 resin (Leona™ 1300S, manufactured by Asahi Kasei Chemicals Corporation)

TABLE 1

| | Manufacturing process | | | | |
|---|---|---|---|---|---|
| | Powdering method | Spherodization | Screening (Sieve recovery) | Addition of fluidizer | Type of resin |
| Example 1 | Fiber cutting | Mechanical stirring: 5,000 rpm 10 minutes | None | None | PBT |
| Example 2 | Fiber cutting | Mechanical stirring: 5,000 rpm 10 minutes | Aperture: 38 μm 30 minutes | None | PBT |
| Example 3 | Fiber cutting | Mechanical stirring: 5,000 rpm 10 minutes | Aperture: 53 μm 30 minutes | None | PBT |

TABLE 1-continued

|  | Manufacturing process | | | | |
| --- | --- | --- | --- | --- | --- |
|  | Powdering method | Spherodization | Screening (Sieve recovery) | Addition of fluidizer | Type of resin |
| Example 4 | Fiber cutting | Mechanical stirring: 5,000 rpm 10 minutes | None | 0.05 percent by mass addition | PBT |
| Example 5 | Fiber cutting | Mechanical stirring: 5,000 rpm 10 minutes | None | 0.08 percent by mass addition | PBT |
| Example 6 | Fiber cutting | Mechanical stirring: 5,000 rpm 10 minutes | None | 0.15 percent by mass addition | PBT |
| Example 7 | Fiber cutting | Mechanical stirring: 5,000 rpm 10 minutes | None | 0.5 percent by mass addition | PBT |
| Example 8 | Fiber cutting | Surface melting 40 kg/hour | None | None | PBT |
| Example 9 | Fiber cutting | Surface melting 20 kg/hour | None | None | PBT |
| Example 10 | Fiber cutting | Mechanical stirring: 5,000 rpm 10 minutes | None | None | PEEK |
| Example 11 | Fiber cutting | Mechanical stirring: 5,000 rpm 10 minutes | None | None | PA66 |
| Example 12 | Fiber cutting | Mechanical stirring: 5,000 rpm 10 minutes | None | None | PP |
| Example 13 | Frost Shattering | Mechanical stirring: 5,000 rpm 10 minutes | Aperture: 38 μm 30 minutes | None | PP |
| Example 14 | Suspension polymerization | None | Aperture: 38 μm 30 minutes | None | PP |
| Example 15 | Fiber cutting | Mechanical stirring: 5,000 rpm 10 minutes | None | None | PBT |
| Comparative Example 1 | Fiber cutting | Mechanical stirring: 7000 rpm 10 minutes | None | None | PBT |
| Comparative Example 2 | Fiber cutting | Mechanical stirring: 9000 rpm 10 minutes | None | None | PBT |
| Comparative Example 3 | Frost shattering | None | None | None | PBT |
| Comparative Example 4 | Frost shattering | None | None | 0.5 percent by mass addition | PBT |
| Comparative Example 5 | Suspension polymerization | None | None | None | PP |

Property of Powder

Properties of the obtained resin powder were evaluated in the following manner. The results are shown in Table 2.

Particle Form

The thus-obtained resin powder was photographed with a magnifying power of 150× using a scanning electron microscope (SEM) (JSM-7800 FPRIME, manufactured by JEOL Ltd.). For each particle in the SEM image obtained by photographing, the particle form was visually identified.

Mean Number Diameter Mn, Proportion of Fine Powder, and Average Circularity of Fine Powder Particle form images were acquired by counting 3,000 or more powder particles using an imaging type wet process particle size and form analyzer (flow particle image analyzer, FPIA-3000, manufactured by Sysmex Corporation) to measure the mean number diameter Mn of each resin powder, the proportion of fine powder having a number diameter of 40 percent or less of a mean number diameter Mn of the resin powder, and the circularity to obtain the average thereof.

Figure 3:
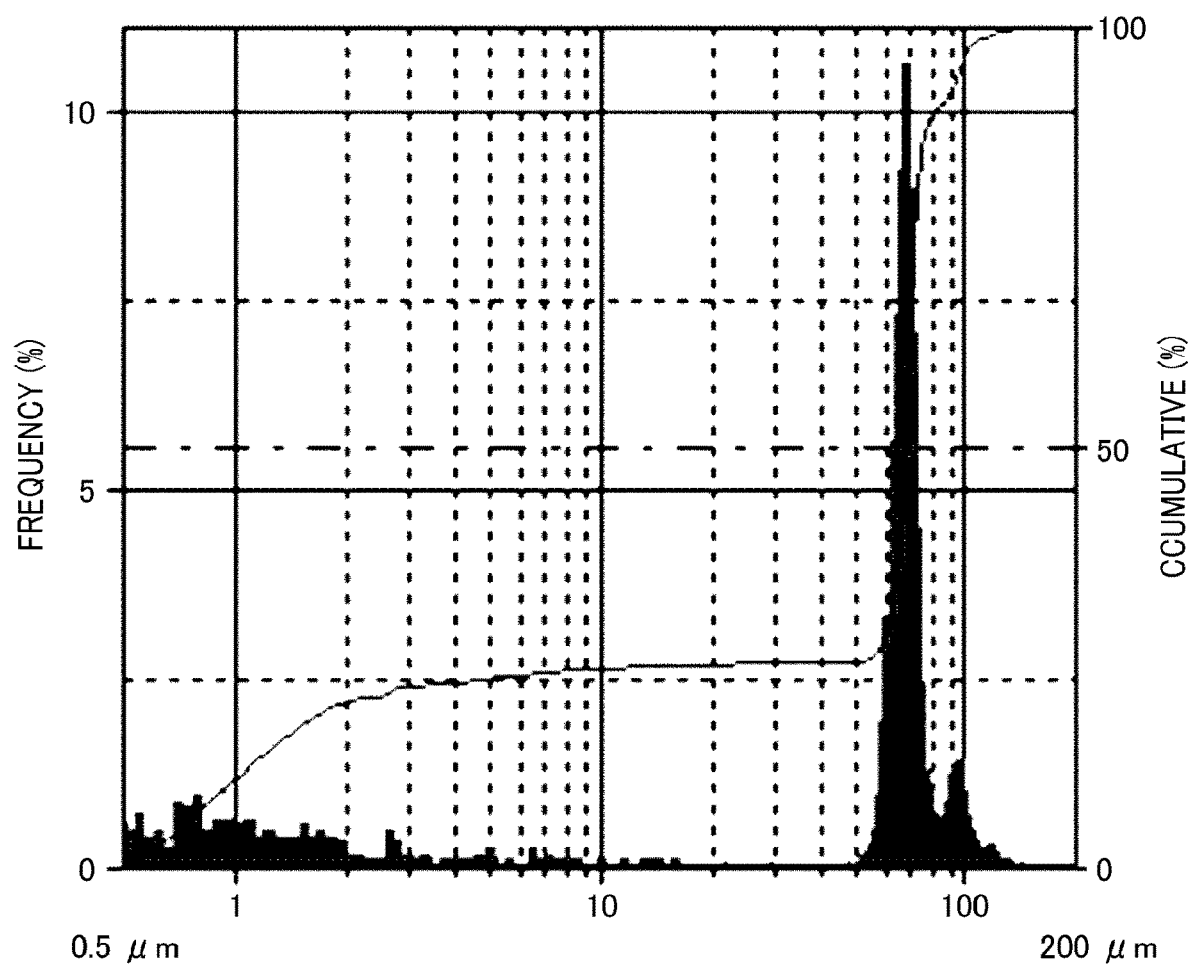
FIG. 3 is a diagram illustrating the distribution of the number diameter (number-basis circle equivalent diameter) of the resin powder in Example 1 described later.
Figure 4:
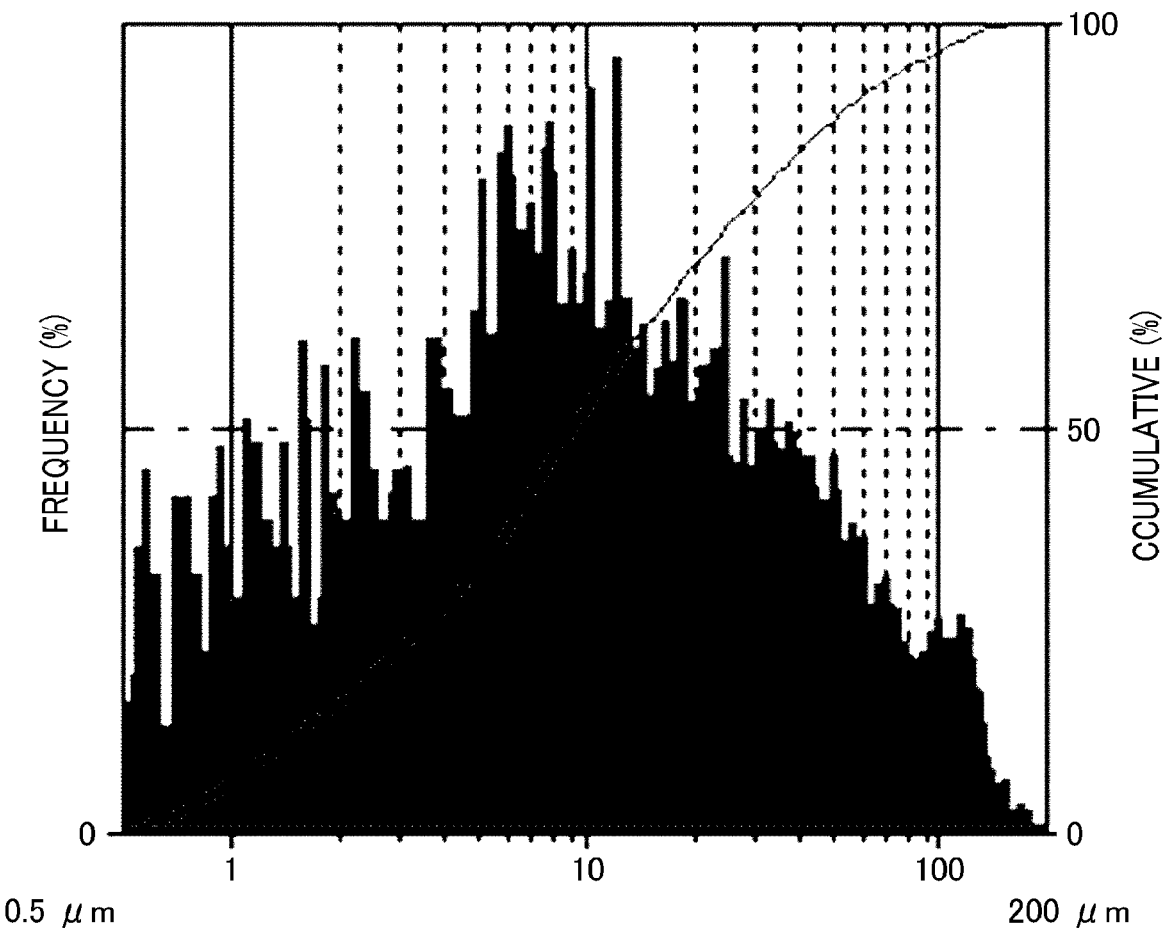
FIG. 4 is a diagram illustrating the distribution of the number diameter (number-basis circle equivalent diameter) of the resin powder in Comparative Example 3 described later.

FIG. 3 is a diagram illustrating the distribution of the mean number diameter Mn of the resin powder of Example 1. FIG. 4 is a diagram illustrating the distribution of the mean number diameter Mn of the resin powder of Comparative Example 3.

Mv/Mn

The mean number diameter of resin powder was measured in the same manner as specified above.

The mean volume diameter Mv of resin powder was measured in the same manner as for Mn. Mv/Mn was calculated based on the obtained Mn and Mv.

BET Specific Surface Area

The specific surface area was measured using an automatic specific surface area measuring device (Gemini V112390, manufactured by Shimadzu Corporation). The pre-processing of degassing was carried out at room temperature under vacuum with a reduced pressure for five hours. The sample amount was set in such a manner that the total specific surface area of the sample was 1 m² or more and measured at liquid nitrogen temperature. The sample was measured twice with nitrogen gas and the specific surface area was calculated by the multi-point method and the average value was determined as the measuring value.

mm; recoater traveling speed of 100 mm/s; a laser power of from 10 to 150 W; a laser scanning space of 0.1 mm; and a part bed temperature of from −3 to 3 degrees C. within the melting point of resin powder. The temperature of the supply tank was set to 10 degrees C. or more below the melting point of the resin powder.

Properties of the obtained fabrication object were evaluated in the following manner. The results are shown in Table 3.

Scatterability

Resin powder scattering and adhering to or accumulating on the moving part including the periphery of the recoater mechanism falls onto the part bed or a selectively sintered or melted part area due to shock during moving and causes defective fabrication. Therefore, fabrication without such scattering and deposition or accumulation is preferable.

Scattering and deposition or accumulation of the resin powder to the moving part including the periphery of the recoater mechanism after fabrication was checked by the following adhesive tape test.

Adhesive Tape Test

A scanning electron microscope (S4200, manufactured by Hitachi, Ltd.) was used to measure the number of particles attached to a scotch tape (manufactured by 3M Company) when the scotch tape was applied to the flat part of the recoater mechanism and detached. Thereafter, the number of

TABLE 2

| | | | Property of powder | | | | |
|---|---|---|---|---|---|---|---|
| | Type of resin | Melting point of resin powder (degrees C.) | Particle form | Mean number diameter Mn (μm) | Mv/Mn | Proportion (percent) of fine powder | BET specific surface area (m²/g) | Average circularity of fine powder |
| Example 1 | PBT | 224 | Columnar | 56 | 1.30 | 24 | 0.01 | 0.781 |
| Example 2 | PBT | 224 | Columnar | 58 | 1.27 | 15 | 0.01 | 0.782 |
| Example 3 | PBT | 224 | Columnar | 59 | 1.25 | 9 | 0.01 | 0.781 |
| Example 4 | PBT | 224 | Columnar | 56 | 1.29 | 22 | 0.31 | 0.781 |
| Example 5 | PBT | 224 | Columnar | 56 | 1.30 | 23 | 0.42 | 0.782 |
| Example 6 | PBT | 224 | Columnar | 56 | 1.30 | 22 | 0.81 | 0.781 |
| Example 7 | PBT | 224 | Columnar | 56 | 1.31 | 28 | 2.40 | 0.781 |
| Example 8 | PBT | 224 | Columnar | 54 | 1.30 | 23 | 0.01 | 0.856 |
| Example 9 | PBT | 224 | Columnar | 54 | 1.30 | 21 | 0.01 | 0.892 |
| Example 10 | PEEK | 373 | Columnar | 48 | 1.34 | 21 | 0.01 | 0.780 |
| Example 11 | PA66 | 265 | Columnar | 51 | 1.31 | 29 | 0.01 | 0.781 |
| Example 12 | PP | 165 | Columnar | 31 | 1.38 | 28 | 0.01 | 0.778 |
| Example 13 | PP | 165 | Quasi-spherical | 25 | 1.41 | 22 | 0.54 | 0.812 |
| Example 14 | PP | 165 | True sphere | 27 | 1.39 | 28 | 0.05 | 0.912 |
| Example 15 | PBT | 224 | Columnar | 110 | 1.30 | 22 | 0.01 | 0.782 |
| Comparative Example 1 | PBT | 224 | Columnar | 49 | 1.43 | 35 | 0.01 | 0.781 |
| Comparative Example 2 | PBT | 224 | Columnar | 44 | 1.47 | 40 | 0.01 | 0.781 |
| Comparative Example 3 | PBT | 224 | Irregular | 21 | 5.21 | 47 | 0.61 | 0.821 |
| Comparative Example 4 | PBT | 224 | Irregular | 21 | 5.23 | 49 | 2.92 | 0.819 |
| Comparative Example 5 | PP | 165 | True sphere | 23 | 3.89 | 36 | 0.08 | 0.916 |

Solid Freeform Fabrication

A solid freeform fabrication object was manufactured by an SLS method fabrication device (AM S5500P, manufactured by Ricoh Co., Ltd.) using the obtained resin powder. The setting conditions were: average layer thickness of 0.1 particles adhering to the tape per area was calculated. The test was conducted at three different locations. The average value of the measured values was calculated and used. When the number of particles was 50 particles/cm² or less, the resin powder is practically usable.

Adhesion to Recoater

The adhesion of the resin powder to the roller of the recoater is particularly likely to occur during heating, and the adhesion of the resin powder to the roller causes a striped depression on the powder surface when the resin powder is supplied, resulting in defective fabrication. Therefore, fabrication without such scattering and deposition or accumulation is preferable. The adhesion of the resin powder to the roller of the recoater during fabrication was visually checked and evaluated according to the following criteria. The resin powder is practically usable when graded S or A.

Evaluation Criteria

A: Adhesion of resin powder to roller of recoater not visually confirmed.

B: Adhesion of resin powder to roller of recoater visually confirmed but there is no dent on powder surface.

C: Adhesion of resin powder to roller of recoater visually confirmed but there is no dent on powder surface.

Tensile Strength Ratio

Five tensile test specimens were fabricated in the longitudinal direction of the specimens and centered with the long side aligned to the direction of Z axis. As the tensile test specimen, a multi-purpose dog-bone-like test specimen (specimen having a center portion of a length of 80 mm, a thickness of 4 mm, and a width of 10 mm) having a length of 150 mm of ISO 3167 Type 1A regulation was used.

The obtained solid freeform object (tensile test specimen) was subjected to a tensile strength test according to ISO 527 regulation with a device (AGS-5kN, manufactured by Shimadzu Corporation) to obtain a tensile strength. The same grade resin pellet material was ejection-molded based on the recommendation condition of the manufacturer and subjected to the same tensile test. The tensile strength of the obtained solid freeform object was divided by the tensile strength of the ejection-molded specimen to obtain the tensile strength ratio. The tensile test speed in the tensile strength test was 50 mm/min. The specimen was tested five times and the average of the measuring values was obtained. The fabrication object was practically usable when the tensile strength ratio was 70 percent or more.

Recyclability

Extra powder used during manufacturing of the solid freeform fabrication object for use in the tensile strength was returned to the supply bed of the device for manufacturing a solid freeform fabrication object and a solid freeform fabrication object was manufactured using the used resin powder. The fabrication condition of the tensile test specimen was that, in the test specimen fabrication condition of the above-mentioned tensile strength ratio, the lamination direction was set along the Y axis direction and the space between each fabrication layer was 5 mm. This operation was repeated 10 times to check whether orange peel occurred and until when the ratio of decrease of the tensile strength was within 30 percent in comparison with the initial value.

The "orange peel" means surface deficiency such as unsuitable coarse surface or voids or warp on the surface of a fabricated object formed by laser sintering according to the PBF method in general. Voids may have significant adverse impacts on mechanical strength as well as aesthetic aspects.

The test speed in the tensile strength test was constant at 50 mm/minute. The maximum stress was determined as the tensile strength. A solid freeform fabrication object for the first fabrication was subject to the test five times. The initial value was determined as the average of the obtained five measuring values.

TABLE 3

| | Evaluation result | | | |
|---|---|---|---|---|
| | Scattering (Number of particles/cm$^2$) | Adhesion to recoater | Tensile strength ratio (%) | Recyclability (Number of repetitions) |
| Example 1 | 11 | A | 82 | 10 or greater |
| Example 2 | 2 | A | 84 | 10 or greater |
| Example 3 | 1 | A | 78 | 10 or greater |
| Example 4 | 13 | A | 78 | 5 |
| Example 5 | 15 | A | 80 | 5 |
| Example 6 | 16 | A | 76 | 3 |
| Example 7 | 23 | A | 79 | 2 |
| Example 8 | 13 | B | 81 | 10 or greater |
| Example 9 | 18 | B | 76 | 10 or greater |
| Example 10 | 21 | A | 82 | 10 or greater |
| Example 11 | 17 | A | 81 | 10 or greater |
| Example 12 | 25 | A | 90 | 10 or greater |
| Example 13 | 10 | A | 76 | 3 |
| Example 14 | 20 | B | 88 | 9 |
| Example 15 | 10 | A | 78 | 10 or greater |
| Comparative Example 1 | 102 | A | 78 | 10 or greater |
| Comparative Example 2 | 239 | A | 80 | 10 or greater |
| Comparative Example 3 | 570 | A | Unable to fabricate | Unable to fabricate |
| Comparative Example 4 | 498 | A | 62 | 3 |
| Comparative Example 5 | 512 | C | 79 | 10 or greater |

Aspects of the present disclosure are, for example, as follows.

1. A resin powder contains a resin, wherein the proportion of fine powder having a number diameter of 40 percent or less of a mean number diameter Mn of the resin powder is 30 percent or less in the resin powder.

2. The resin powder according to 1 mentioned above, wherein the proportion of the fine powder is 20 percent or less.

3. The resin powder according to 1 or 2 mentioned above, wherein the resin powder has a BET specific surface area of 0.50 m$^2$/g or less.

4. The resin powder according to 3 mentioned above, wherein the resin powder has a BET specific surface area of 0.30 m$^2$/g or less.

5. The resin powder according to 4 mentioned above, wherein the resin powder has a BET specific surface area of 0.10 m$^2$/g or less.

6. The resin powder according to any one of 1 to 5 mentioned above, wherein the mean number diameter Mn is from 3 to 110 μm.

7. The resin powder according to any one of 1 to 6 mentioned above, wherein the ratio (Mv/Mn) of the mean volume diameter Mv to the mean number diameter Mn is 1.40 or less.

8. The resin powder according to any one of 1 to 7 mentioned above, wherein the resin contains a thermoplastic resin.

9. The resin powder according to 8 mentioned above, wherein the thermoplastic resin contains at least one member selected from the group consisting of a polyolefin, a polyamide, a polyester, and a polyether.

10. The resin powder according to 9 mentioned above, wherein the polyamide contains at least one member selected from the group consisting of polyamide 410, polyamide 4T, polyamide 6, polyamide 66, polyamide MXD6, polyamide 610, polyamide 6T, polyamide 11, polyamide 9T, polyamide 10T, and aramid.

11. The resin powder according to 9 mentioned above, wherein the thermoplastic resin is at least one member selected from the group consisting of polybutylene terephthalate, polyetheretherketone, and polypropylene.

12. The resin powder according to any one of 1 to 11 mentioned above, wherein the fine powder has an average circularity of 0.850 or less.

13. The resin powder according to 12 mentioned above, wherein the fine powder has an average circularity of from 0.700 to 0.850.

14. The resin powder according to any one of 1 to 13 mentioned above, wherein the resin powder contains columnar particles.

15. The resin powder according to any one of 1 to 14 mentioned above, manufactured by processing the resin powder into a resin fiber having a fiber form and cutting the resin fiber.

16. The resin powder according to 15 mentioned above, wherein the resin fiber is cut into a size of from 0.04 to 0.10 mm.

17. The resin powder according to any one of 1 to 16 mentioned above for solid freeform fabrication.

18. A device for manufacturing a solid freeform fabrication object includes a layer forming device configured to form a layer containing a resin powder containing a resin and a powder attaching device configured to attach the resin powder in a selected area of the layer, wherein the proportion of fine powder having a number diameter of 40 percent or less of a mean number diameter Mn of the resin powder is 30 percent or less in the resin powder.

19. A method of manufacturing a solid freeform fabrication object includes forming a layer containing a resin powder containing a resin, curing the layer, and repeating the forming and the curing, wherein the proportion of fine powder having a number diameter of 40 percent or less of a mean number diameter Mn of the resin powder is 30 percent or less in the resin powder.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A resin powder comprising:
   a resin,
   wherein a proportion of fine powder having a number diameter of 40 percent or less of a mean number diameter Mn of the resin powder is 30 percent or less in the resin powder, and
   wherein the resin powder has a BET specific surface area of 0.50 m²/g or less.

2. The resin powder according to claim 1, wherein the proportion of fine powder is 20 percent or less.

3. The resin powder according to claim 1, wherein the resin powder has a BET specific surface area of 0.30 m²/g or less.

4. The resin powder according to claim 3, wherein the resin powder has a BET specific surface area of 0.10 m²/g or less.

5. The resin powder according to claim 1, wherein the mean number diameter Mn is from 3 to 110 μm.

6. The resin powder according to claim 1, wherein a ratio (Mv/Mn) of the mean volume diameter Mv of the resin powder to the mean number diameter Mn of the resin powder is 1.40 or less.

7. The resin powder according to claim 1, wherein the resin comprises a thermoplastic resin.

8. The resin powder according to claim 7, wherein the thermoplastic resin comprises at least one member selected from the group consisting of polyolefin, polyamide, polyester, and polyether.

9. The resin powder according to claim 8, wherein the polyamide comprises at least one member selected from the group consisting of polyamide 410, polyamide 4T, polyamide 6, polyamide 66, polyamide MXD6, polyamide 610, polyamide 6T, polyamide 11, polyamide 9T, polyamide 10T, and aramid.

10. The resin powder according to claim 1, wherein the fine powder has an average circularity of 0.850 or less.

11. The resin powder according to claim 1, wherein the resin powder comprises columnar particles.

12. The resin powder according to claim 1, produced by processing the resin powder into a resin fiber having a fiber form and cutting the resin fiber.

13. The resin powder according to claim 12, wherein the resin fiber is cut into a size of from 0.04 to 0.10 mm.

14. The resin powder according to claim 1 for solid freeform fabrication.

15. A device for manufacturing a solid freeform fabrication object comprising:
   the resin powder of claim 1,
   a layer forming device configured to form a layer comprising the resin powder; and
   a powder attaching device configured to attach the resin powder in a selected area of the layer.

16. A method of manufacturing a solid freeform fabrication object comprising:
   forming a layer comprising resin powder of claim 1;
   curing the layer; and
   repeating the forming and the curing.

* * * * *